(12) United States Patent
Jackson

(10) Patent No.: US 12,399,752 B2
(45) Date of Patent: Aug. 26, 2025

(54) METHODS AND SYSTEMS FOR COMPUTERISED RESOURCE ALLOCATION CONTROL

(71) Applicant: Socius Technologies (IP) Limited, Guildford (GB)

(72) Inventor: Alex Jackson, Guildford (GB)

(73) Assignee: Socius Technologies (IP) Limited, Guildford (GB)

( * ) Notice: Subject to any disclaimer, the term of this patent is extended or adjusted under 35 U.S.C. 154(b) by 425 days.

(21) Appl. No.: 17/843,853

(22) Filed: Jun. 17, 2022

(65) Prior Publication Data

US 2022/0405148 A1   Dec. 22, 2022

(30) Foreign Application Priority Data

Jun. 21, 2021   (GB) .................................. 21180627.8

(51) Int. Cl.
    *G06F 9/50*        (2006.01)
(52) U.S. Cl.
    CPC ............ *G06F 9/5077* (2013.01); *G06F 9/505* (2013.01)
(58) Field of Classification Search
    None
    See application file for complete search history.

(56) References Cited

U.S. PATENT DOCUMENTS

| | | | | |
|---|---|---|---|---|
| 9,858,095 B2 * | 1/2018 | Breitgand | ............. | G06F 9/5005 |
| 10,409,642 B1 * | 9/2019 | Tang | ..................... | G06F 9/5005 |
| 11,128,699 B1 * | 9/2021 | Khurrum | ............ | G06F 9/45558 |
| 11,467,872 B1 * | 10/2022 | Mauer | ...................... | G06N 5/04 |
| 2012/0173709 A1 * | 7/2012 | Li | .......................... | G06F 9/5011 709/224 |
| 2016/0139948 A1 * | 5/2016 | Beveridge | ............... | G06F 9/542 718/1 |
| 2016/0164797 A1 * | 6/2016 | Reque | ................... | G06F 9/5077 718/1 |
| 2019/0034242 A1 * | 1/2019 | Nutter | ................... | G06F 9/5055 |
| 2022/0374273 A1 * | 11/2022 | Eldar | .................... | G06F 16/254 |

* cited by examiner

*Primary Examiner* — Charles E Anya
(74) *Attorney, Agent, or Firm* — Wolf, Greenfield & Sacks, P.C.

(57) ABSTRACT

An intended state of a computerised resource repository is computed based on a received data mode, received historical data, and received error data is provided. The data model comprises rules for updating the state of each computerised resource repository of a plurality of computerized resource repositories based on one more inputs. The state of each computerized resource repository comprises a volume of the resource in said each computerized resource repository. The historical data comprises a plurality of previous inputs to the data model. The error data indicates of an error in one of the previous inputs of the historical data. A difference is then determined between the current volume of the resource in the computerised resource repository, indicated by received data, and the volume of the resource in the intended state of the computerized resource repository. Finally, a volume of the resource equal to the determined difference is allocated to the computerised resource repository from a control computerised resource repository, or vice versa, to correct the difference.

10 Claims, 8 Drawing Sheets

METHODS AND SYSTEMS FOR COMPUTERISED RESOURCE ALLOCATION CONTROL

RELATED APPLICATIONS

This application claims foreign priority benefits under 35 U.S.C. § 119(a)-(d) or 35 U.S.C. § 36(b) of European application number 21180627.8, filed on Jun. 21, 2021, now patent number EP 4109254 A1, the entirety of which is incorporated herein.

FIELD OF INVENTION

The present invention relates to computer-implemented methods and systems for controlling a plurality of computerised resource repositories within a resource allocation system, and in particular for correcting differences between actual states of one or more computerised resource repositories and their intended states according to a data model, where these differences have been introduced by erroneous inputs to the data model.

BACKGROUND

Computerised data repositories are presently used in a wide-ranging variety of applications for computer-implemented control of electronically stored resources. In many cases, these resources may have no "physical" existence outside of the computer system used to store them, or may at least exist only as resources within one or more (possibly networked) computer systems, residing inside computer hardware which may include (but is not limited to) processor registers, random-access memory (RAM) hardware, flash memory devices such as memory cards, flash drives and solid-state drives or longer-term storage devices such as hard disk drives. Additionally or alternatively, these resources may be "logical" or "virtual" resources in the sense that they are electronic digital representations of resources or assets inside or outside the computer system. For example, many modern computer systems draw a distinction between the "logical" memory addresses perceived by the operating system and the actual "physical" addresses in the computer hardware (which may be substantially differently arranged).

In many cases, a computer system may be used to control a plurality of computerised resource repositories, each of which is in some "state" at any given instant in time, this state including or being associated with some particular volume of the resource. It may further be desirable or necessary for the computer system controlling the repositories to respond to certain inputs by adjusting the volume of the resource held in or associated with at least one repository of the plurality of repositories. These inputs may be user-generated or machine-generated, and may arrive at the control either directly from a source or indirectly. Moreover, the decision to adjust the volume of the resource, the direction of this adjustment (whether the volume is increased or decreased) and the magnitude of the adjustment may depend upon the current state of the repository (or repositories) to be adjusted, as well as the input.

For this reason, the computer system may follow a "data model" when processing inputs, the data model comprising a set of rules which specify exactly how repositories should be "advanced" from one particular state to the next in response to the inputs arriving.

Since the state of any given repository can be associated with a volume of resource held inside or linked to that repository, actually performing the state update of a repository, as dictated by the data model in response to an input, can require a material change in the volume/quantity/amount of the resource physically or logically held in that repository. Known existing resource allocation systems may typically update the states of repositories, following the data model, by acquiring the required extra volume of the resource from a source external to the resource allocation system, or, conversely, by relinquishing the detected surplus volume of the resource to such an external source.

Such external sources may be imperfect for a variety of technical reasons. In some settings, for example, a resource may be acquired to (or relinquished from) a computerised resource repository by the transmission of an electronic request, regarding the acquisition or relinquishment of a particular amount of the resource, from or to a resource provider e.g. over a network. This can lead to a subsequent increase (or decrease) in the volume of the resource for said repository, for example by the resource provider directly allocating an amount of the resource to (or from) the repository; once again, potentially over said network, or another network. However, in many contexts, the resource provider may not be capable of reliably responding to the electronic request by providing the repository with (or taking from the repository) exactly the amount of the resource which was specified in the request. That is, the amount of resource initially requested by a repository (or by the controller on behalf of the repository) for acquisition thereto or relinquishment therefrom may be different from the amount by which the volume of resource held in the repository subsequently actually increases/decreases (and/or the amount transferred from the resource provider to/from the repository). For example, the nature of the external source may be such that, in response to a request to acquire 10 "units" of some given resource, the external source actually credits a repository with 12 units.

Alternatively, in some contexts the controller may be able to transmit requests to the resource provider to acquire therefrom (or relinquish thereto) amounts of the resource of varying magnitudes, such as a request to acquire/relinquish a small amount of the resource, a request to acquire/relinquish a medium amount of the resource, a request to acquire/relinquish a large amount of the resource, and so forth, but not able to specifically request an exact number of units of the resource to be acquired or relinquished. In such cases, the number of units of the resource actually acquired or relinquished may closely correspond to the magnitude specified in the request, but it may nevertheless be difficult or impossible to determine in advance how many units will be acquired/relinquished in response to a request for an amount of any given magnitude.

It will be appreciated by those skilled in the art that, whilst the above non-limiting illustrative examples (and the other illustrative examples provided throughout the present disclosure) concern a discrete resource being transferrable and/or storable in integer quantities, the present invention is by no means limited to application to such discrete resource types (e.g. logical bits in memory), and is equally applicable to the control of resource allocation systems for continuous resources, which can be transferred and/or stored in non-integer volumes (e.g. amounts representable by rational number or real numbers, such as, by way of non-limiting example, read/program voltages in a memory device).

The external source may also be imperfect in that it brings about a latency delay between the request to acquire a volume of a resource to (or relinquish it from) a computerised resource repository on one hand, and the subsequent change in the total volume of resource stored in or associated with that repository on the other. This latency delay may be due to latency/lag/congestion on a network, due to a latency delay in processing of the request at the resource provider, or due to another factor or a combination of factors. In any event, such a latency delay (where one exists) may be determined to be inevitable and/or acceptable for the purposes of normal, routine use of the data model to manage the volume of the resource for each computerised resource repository in a plurality of such repositories by acquiring or relinquishing resources to or from the external source according to the update rules.

However, these issues become much more problematic in situations where, following a spell of such normal usage of the data model by a controller to acquire and relinquish resources to or from repositories in response to a sequence of inputs, it has been determined that one of these previous inputs to the model was erroneous, leading to at least one repository having a current state that comprises either too much or too little of the resource, in comparison with the volume that at least one repository should currently have (based on the "corrected" previous input, in view of the data model's update rules).

One way for a computer-implemented resource controller to "correct" these errors would be to compute the intended state of a repository (i.e. the state it "should" be in, and would be in had the error never occurred) based on the data model, the historical input data previously used to repeatedly advance each of the repositories from one state to the next over time, and the details of the error and its correction, and then compare this intended state to the actual current state of the repository (affected by the error) to determine a difference in volumes of the resource. For example, by replaying all of the inputs to the model in this way, from the input containing the error up to the most recent model input, and simulating the evolution of the state of each of the repositories accordingly, it might be determined that a repository contains too much of the resource, or too little of the resource. The controller might then, in this naïve solution, try to correct the discrepancy between intended state and actual state by attempting to increase or decrease the volume of resource currently held in or associated with the repository. This may be done, for example, by transmitting a request (to acquire/relinquish a volume of the resource equal to the determined discrepancy) to an external source such as a resource provider.

A problem with this approach is that the correction of the error will itself also suffer from the same latency delay introduced by the external source, meaning that states of repositories may still be incorrect (i.e. have a different volume of the resource in comparison to the "intended" state dictated by the data model and prior inputs) indefinitely, i.e. forever or for an arbitrarily long period, even after the error in the input has been detected, its corrected value has been received and used with other prior inputs to replay the evolution of repository states according to the update rules and hence compute an intended state, the difference in actual/intended states has been determined, and an attempt has been made to correct the error by requesting acquisition or relinquishment of resources to or from the external source.

To make matters worse, during the period of latency delay (and hence after the discrepancy in volume of the resource in one or more repositories has been determined, but before the volume of resource has been increased or decreased to correct the discrepancy), new data model inputs may have been received by the controller. The controller is therefore, in such examples, forced either to defer/halt repository state updates until the error has been completely resolved by acquisition of an amount of the resource from the external source or relinquishment of an amount of the resource to the external source (which may well be unacceptable), or, alternatively, to apply all of the relevant state updates upon receipt of any new inputs whilst waiting for the resource to be acquired/relinquished, and have to deal with the fact that when the requested resource eventually comes (or goes) it will no longer be the exact amount needed to correct the discrepancy, because the repository's own state will have moved on in the meantime in response to the new input or inputs.

The above problems are compounded yet further still in cases where the external source cannot be relied upon to provide increases and/or decreases in repository resource volumes of the exact amount requested by the controller, as mentioned briefly above. For example, a resource provider may not always be able (or be willing) to allocate the exact requested amount of the resource into a computerised resource repository. Additionally or alternatively, a resource provider may not always be able (or be willing) to remove the exact specified amount of the resource from a computerised resource repository. Consequently, in many situations it may prove to be highly difficult to correct an error by using the approach mentioned above, since attempts to acquire or relinquish a volume of the resource to/from a resource repository to fix the computed discrepancy may result in too much or too little being electronically allocated, giving rise to a further "incorrect" stored volume, and hence are likely to simply propagate the error (in a partial manner) along the line from one point in time to a later one, instead of (entirely) resolving the error.

It is the aim of the present invention to solve the aforementioned problems and other problems associated with the control of resource allocation within collections of computerised resource repositories.

SUMMARY

In a first aspect of the invention, there is provided a computer-implemented method for controlling a plurality of computerised resource repositories within a resource allocation system, the method comprising: receiving: a data model for a resource, the data model comprising rules for updating the state of each computerised resource repository of the plurality of computerised resource repositories based on one or more inputs, wherein the state of each computerised resource repository comprises a volume of the resource in said each computerised resource repository; historical data comprising a plurality of previous inputs to the data model; data indicative of the current volume of the resource in a first computerised resource repository of the plurality of computerised resource repositories; and error data indicative of an error in one of the previous inputs of the historical data; based on the data model, historical data and error data, computing an intended state of the first computerised resource repository; determining a difference between the current volume of the resource in the first computerised resource repository and the volume of the resource in the intended state of the first computerised resource repository; and allocating a volume of the resource equal to the determined difference to the first computerised resource repository from a control computerised resource repository, or vice versa, to correct the difference.

Data models for resource allocation are often successfully employed in settings where it is necessary or desirous to maintain a careful control of how a resource is distributed among a set of repositories and/or to manage the flow of the resource into the system, out of the system, and around the system internally. Such models can be used to model the presumed or ideal allocation of resource volumes in response to input, in industries such as chemical processing, manufacturing, water treatment, or fuel-based electricity generation, where an element of "lag" or "latency" may exist between the repository state changes or updates dictated by the simulation or model, and the actual acquisition or relinquishment of physical resources. Likewise, such a latency delay may be felt in applications of data models involving resources which exist only or primarily in electronic form, such as in computing and data processing.

By using the control computerised resource repository, the repository controller becomes able to fix the discrepancy that has arisen between the current volume and the intended volume with a single allocation of a volume of the resource, and is no longer required to rely on slower and/or less reliable solutions (e.g. sending a request to an external source such as a resource provider to acquire or relinquish some volume of the resource). This means that the problem of the first repository being in an incorrect state due to a prior error in the input data can be fully and accurately resolved (rather than merely propagated and/or partially resolved) before additional data model inputs cause the model to advance to a subsequent processing stage and compute the next set of state updates for the repositories, which could potentially also impact the first repository's state. Hence, the effects of the erroneous input data are directly eliminated, instead of compounding (as they would without the provision of the control repository).

The method may optionally further comprise receiving one or more data model inputs and, based on the data model and the one or more received inputs, updating the state of one or more computerised resource repositories of the plurality of computerised resource repositories.

Additionally or alternatively, the method may optionally further comprise determining whether the current volume of the resource in the control computerised resource repository is outside of a threshold range and, in accordance with such a determination, updating the state of the control computerised resource repository to bring said volume within the threshold range.

This is beneficial in cases where it is desirous to prevent a surplus of the resource accumulating in the control repository and/or desirous to prevent a dearth or deficit of the resource in the control repository (as is often the case in e.g. industrial resource control systems), since it ensures that the control repository maintains a volume of the resource within the predetermined "acceptable" bound(s).

Updating the state of a computerised resource repository may comprise increasing or decreasing the volume of the resource in said computerised resource repository. Increasing or decreasing the volume of the resource for a computerised resource repository may comprise updating by increasing or decreasing a volume of the resource from a source external to the implementing computer.

Said increasing or decreasing may be associated with a first latency delay. For example, the first latency delay may be caused by delays generated from the external source. Allocating the volume of the resource equal to the determined difference may associated with a second latency delay, the second latency delay being less than the first latency delay.

The first latency delay may be in a range from 1 minute to 1 week, from 10 minutes to 1 week, from 30 minutes to 1 week, from 1 hour to 1 week, from 6 hours to 1 week, from 12 hours to 1 week or from 1 day to 1 week. The first latency delay may be in a range from 1 minute to 5 days, from 10 minutes to 5 days, from 30 minutes to 5 days, from one hour to 5 days, from 6 hours to 5 days, from 12 hours to 5 days or from 1 day to 5 days. The first latency delay may be in a range from 1 minute to 3 days, from 10 minutes to 3 days, from 30 minutes to 3 days, from 1 hour to 3 days, from 6 hours to 3 days, from 12 hours to 3 days or from 1 day to 3 days. The first latency delay may be in a range from 1 minute to 1 day, from 10 minutes to 1 day, from 30 minutes to 1 day, from 1 hour to 1 day, from 6 hours to 1 day or from 12 hours to 1 day. In the above examples, a "day" means a period of 24 hours, and a "week" means a period of 168 hours.

The first latency delay may be in a range from 0.1 milliseconds to 10 minutes, from 0.1 milliseconds to 5 minutes, from 0.1 milliseconds to 2 minutes, from 0.1 milliseconds to 1 minute, from 0.1 milliseconds to 30 seconds, from 0.1 milliseconds to 10 seconds, from 0.1 milliseconds to 1 second, from 0.1 milliseconds to 100 milliseconds, from 0.1 milliseconds to 10 milliseconds, or from 0.1 milliseconds to 1 millisecond. The first latency delay may be in a range from 10 milliseconds to 10 minutes, from 10 milliseconds to 5 minutes, from 10 milliseconds to 2 minutes, from 10 milliseconds to 1 minute, from 10 milliseconds to 30 seconds, from 10 milliseconds to 10 seconds, from 10 milliseconds to 1 second, or from 10 milliseconds to 100 milliseconds. The first latency delay may be in a range from 1 second to 10 minutes, from 1 second to 5 minutes, from 1 second to 2 minutes, from 1 second to 1 minute, from 1 second to 30 seconds, or from 1 second to 10 seconds.

The second latency delay may be less than 12 hours, less than 6 hours, less than 3 hours, less than 1 hour, less than 30 minutes, less than 10 minutes, less than 5 minutes, less than 2 minutes, less than 1 minute, less than 30 seconds, less than 10 seconds, less than a second, less than 10 milliseconds, or less than 0.1 milliseconds. Allocating the volume of the resource equal to the determined difference may occur instantaneously. Having a second latency delay which is small, or allocating the volume instantaneously, enables an improvement in the speed at which the error in the current volume of the first computerised resource repository can be corrected, since it becomes no longer necessary to wait for the first latency delay to pass.

The intended state of the first computerised resource repository may correspond to an assumed current state of the first computerised resource repository, according to the data model and historical data, had the error never occurred.

In some optional embodiments, the method may further comprise: receiving data indicative of the current volume of the resource in a second computerised resource repository of the plurality of computerised resource repositories; based on the data model, historical data and error data, computing an intended state of the second computerised resource repository; determining a difference between the current volume of the resource in the second computerised resource repository and the volume of the resource in the intended state of the second computerised resource repository; and allocating a volume of the resource equal to the determined difference to the second computerised resource repository from the control computerised resource repository, or vice versa, to correct the difference. In this way, a single control computerised resource repository can be used to redress the volume of the resource in a plurality of computerised resource repositories that have been affected by the same item of erroneous input data for the same resource and data model.

Optionally, each data model input may be received from an input provider of a plurality of input providers, the control computerised resource repository may be one of a plurality of control computerised resource repositories, each control computerised resource repository being linked with an input provider, and the control computerised resource repository selected for correcting the difference may be linked with the input provider responsible for the error.

In a further aspect of the invention, there is provided a device comprising a memory and a processor, the memory containing instructions which, when executed by the processor, are configured to cause the processor to carry out the above method. In a yet further aspect of the invention, there is provided a computer program comprising computer-readable instructions which, when executed by a processor, are configured to cause the processor to carry out the above method.

BRIEF DESCRIPTION OF THE DRAWINGS

The present invention has been described below purely by way of example with reference to the accompanying drawings in which.

DETAILED DESCRIPTION

Figure 1:
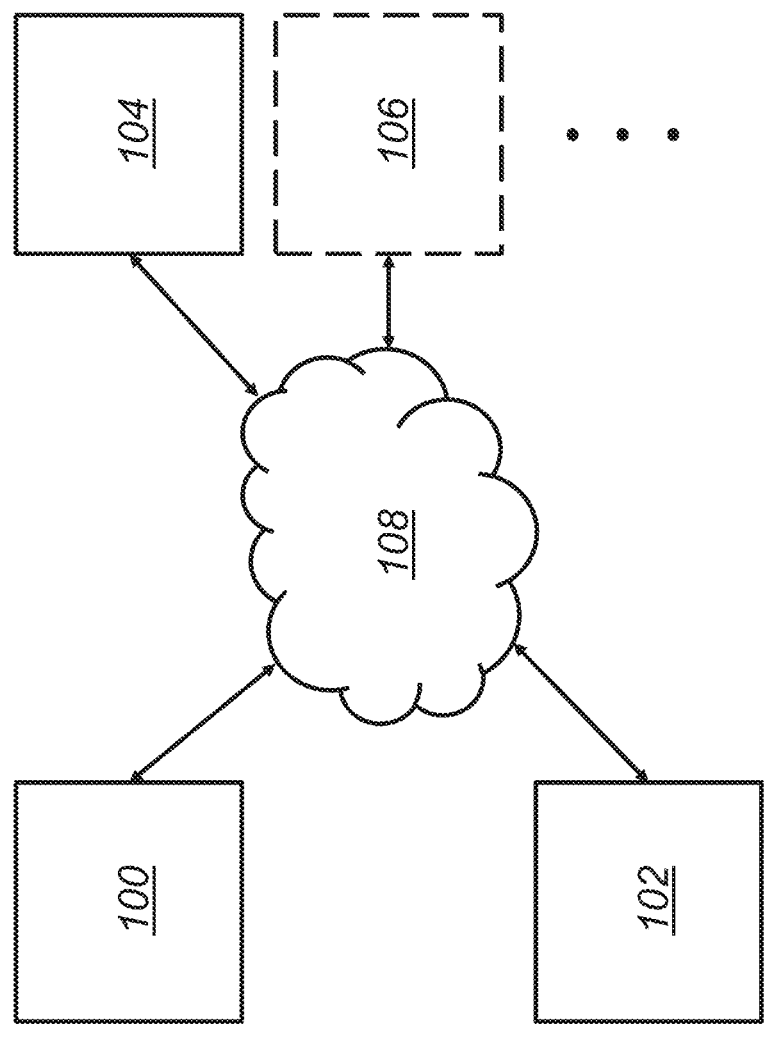
FIG. 1 is a component diagram of the overall resource allocation system in which the invention is implemented.

Referring to FIG. 1, there is provided a system 10 for resource allocation involving computerised resource repositories. The system 10 comprises a repository controller 100, a resource provider 102, an input source 104 and optional additional input sources 106 . . . . Each of the repository controller 100, the resource provider 102 and the input source(s) 104, 106 . . . may be in communication with each other via the internet 108 and are illustrated as such in FIG. 1, although it will be recognised by those skilled in the art that other networked configurations of the repository controller 100, resource provider 102 and input source(s) 104, 106 . . . are possible. For example, the input source and resource provider need not share a direct connection or be connected by the internet, so long as both are connected in some way to the repository controller. The repository controller 100 is configured to process inputs received from the input source 104 in accordance with the processes described herein.

Figure 2:
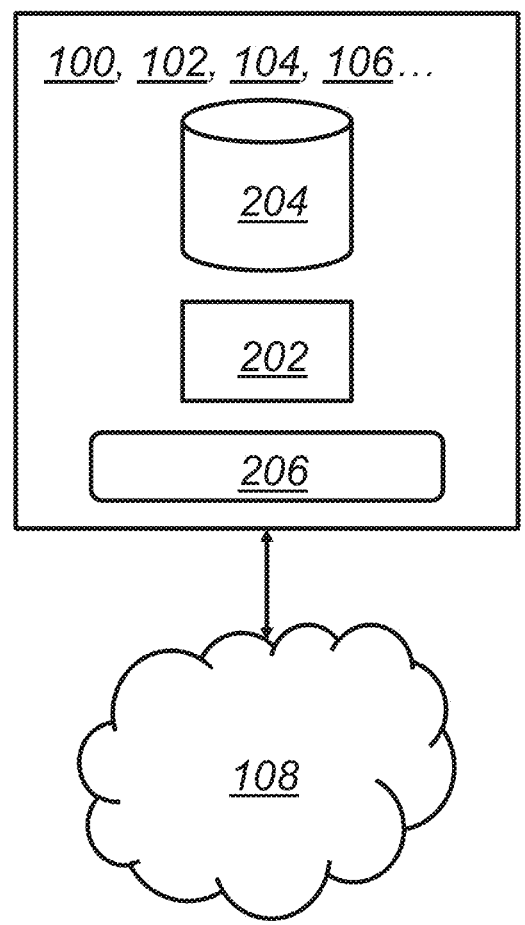
FIG. 2 is a component diagram of the repository controller (and other computer devices) of FIG. 1.

Referring to FIG. 2, additional components of the repository controller 100 are depicted, including a processor 202, memory 204 and communication interface 206. The processor 202 is configured to obtain computer executable code from the memory 204 and execute the computer executable code to perform the processes described herein. The resource provider 102, input source 104 and optional additional input sources 106 . . . may each also be configured with the same type of components in the same fashion as depicted in FIG. 2. In some embodiments, any one or more of the repository controller 100, resource provider 102 and input source(s) 104, 106 . . . may additionally be configured with components for user interaction such as a display and/or a user input device configured to receive user input into processor 202. However, it will be recognised that such user-facing features are by no means necessary in order to realise the benefits associated with the present invention.

In some embodiments, repository controller 100 stores a plurality of computerised resource repositories (not pictured here) inside memory 204. The plurality of repositories may be stored in a short-term type of memory hardware in memory 204, such as in RAM. Additionally or alternatively, the repositories may be stored in a longer-term device in memory 204 having a higher capacity, such as a hard disk drive. In some embodiments, repositories and their data may be may be stored externally to repository controller 100 itself e.g. inside a database in another computing device connected to repository controller 100 via a network, such as internet 108. In any case, it is preferable for the repositories and/or data concerning the repositories (such as the volume of the resource held in or associated with each repository) to be easily and rapidly accessible to repository controller 100.

The repositories may in some embodiments physically contain the resource. However, in other embodiments, each repository may act as a "logical" store holding an electronic representation of the resource itself; for example, in the case of empty memory pages as a resource, where one empty memory page is (in terms of functional content) no different to another, each repository may simply contain a numeric representation of a number of empty memory pages associated with that particular repository, rather than physically comprising that set of empty pages within the computer hardware of resource controller 100. The present invention may be particularly effective when applied to resources which are "uniform" in this way—that is, where any two given discrete units of the resource are functionally alike.

The data model is stored in hardware which is easily accessible by processor 202 of repository controller 100, such as in memory 204. The data model may be held in ROM or RAM, or held in and retrieved from a solid state or hard disk drive, or stored externally to the repository controller 100 and retrieved via a network such as the internet 108 using communication interface 206. Other technical means of storing the data model and retrieving it for use by processor 202 will be evident to those of ordinary skill in the art.

Processor 202 is configured to receive data model inputs from input source 104 via internet 108 and communication interface 206. Input source 104 may provide these inputs in response to actions, commands or other inputs provided to input source 104 by a human user. These may be direct in nature, such as the user moving and clicking a mouse or entering keystrokes on a peripheral device connected to input source 104, or may be indirect e.g. received from another computing device (not pictured) communicatively coupled to input source 104. Alternatively or additionally, the inputs received from input source may be machine-generated inputs e.g. data computed by and a processing component of a server (which may be input source 104 itself). Further inputs may optionally be transmitted to repository controller and/or generated at one or more additional input sources 106 . . . . In many of the contemplated embodiments of the present invention, each input source 104, 106 . . . provides either user inputs and commands to repository controller 100 or provides inputs in the form of machine-generated data; however, it will be appreciated that any given input source 104, 106 . . . may provide any type of data model input to repository controller 100 or may provide a mixture of several different types of input.

It will be appreciated that the transmission of data model inputs from the input source 104 (and/or optional additional sources) to repository controller 100, and indeed any transfer of data among components of resource allocation system 10, may occur in a variety of specific ways, many of which are essentially functionally equivalent for the purposes of the present invention. For example, data may be transferred from one computing component to another computing component over a network such as internet 108 via "push"-style proactive sending steps by the transferring component, or via "pull"-style steps carried out on the processor of the receiving component, such as repeated polling of the transferring component to determine whether new data is available and ready to be transferred. Networking may be implemented using a layered model such as the TCP/IP model in accordance with any suitable set of selected application, transport, internet and data link layer protocols as will be known to those skilled in the art.

Processor 202 of repository controller 100 is configured to use the received data model inputs in conjunction with the data model to compute state updates for the plurality of repositories, as is described in greater detail with reference to FIGS. 3A-3C below. At each subsequent processing stage, processor 202 is configured to compare the "current" volume of the resource in each repository of the plurality of repositories (that is, the volume associated with the current state prior to its being updated according to the data model) against the volume for the computed updated state to determine an increase or decrease in the resource volume necessary in order to effect the update dictated by the data model and hence change the state of each repository to match the determined "next" or "updated" state according to the input. This increase/decrease in the volume of the resource for each repository can subsequently be achieved by acquiring an amount of the resource from (or relinquishing it to) resource provider 102, as described in more detail later.

Repository controller 100 may be configured to calculate and/or enact state updates for the repositories from one processing stage to another, as mentioned above, using processor 202. In some embodiments, "processing stages" may refer to successive points in time, e.g. points in time uniformly separated by a predetermined interval. In such an example, updates may be computed every (say) hundredth of a second, irrespective of whether an input has been received. However, in some embodiments the "processing stages" may be event-based steps, defined by reference to the arrival of new data model inputs, since there may well be no need to compute the updated repository states until the next input is received from input provider 104, so that computing resources are not wasted.

It is not at all necessary for the repository controller to enact the computed state updates for the computerised resource repositories at the same time or even soon after they are calculated. Indeed, in many of the embodiments presently contemplated, repository controller 100 may compute several state updates successively without any actual increase or decrease in repository volumes being effected, but may choose to actually acquire resource from or relinquish them to resource provider 102 to enact the state updates substantially less frequently. In other words, repository controller 100 can compute a plurality of updated states for repositories under its control without any change being applied to the repository states, and then effectively bring the repositories up-to-date "in batch" by acquiring or relinquishing resources to/from resource provider 102 all at once as needed.

Such "batch" acquisition or relinquishment may be advantageous in that it can reduce the total number of requests that must be transmitted from repository controller 100 to resource provider 102 over any given time period, thus saving computational and network resources for resource allocation system 10.

Once repository controller 100 has calculated the volume of resource that must be acquired or relinquished for each repository to bring the state of said each repository in line with the updated state determined by the data model and input(s), it sends data in the form of an electronic request to resource provider 102 to add a volume of the resource to (or remove it from) the repository or repositories. As previously explained, there may be a latency delay between the transmission of this request and the actual change in volume of resource for a repository. Resource provider 102 may be responsible for the delay, in some embodiments, by enacting the electronic acquisition or relinquishment of resources some time after its receipt of the request, or at least some time after the submission of the request by repository controller 100.

Repository controller 100 may store a record of historical data model inputs that it has previously received within memory 204, in a suitable data structure such as a database. Additionally or alternatively, recorded data representative of past inputs for the data model may be stored on another computer system which is communicatively coupled to repository controller 100, or distributed across several such systems, and repository controller 100 may be configured to acquire said data "on-the-fly" as and when it is needed, by interrogating said another computer system to request the data. The data may then be transferred in batch to repository controller 100. In some embodiments, one or both of input provider 104 and/or resource provider 102 may act as the "other" computer system storing the past data model input records.

Repository controller is also configured to receive error data from input provider 104, and optionally from the additional input providers 106 . . . , indicating an error in a past input. More detail on error data is provided in the discussion of FIG. 3C below.

Figure 3A:
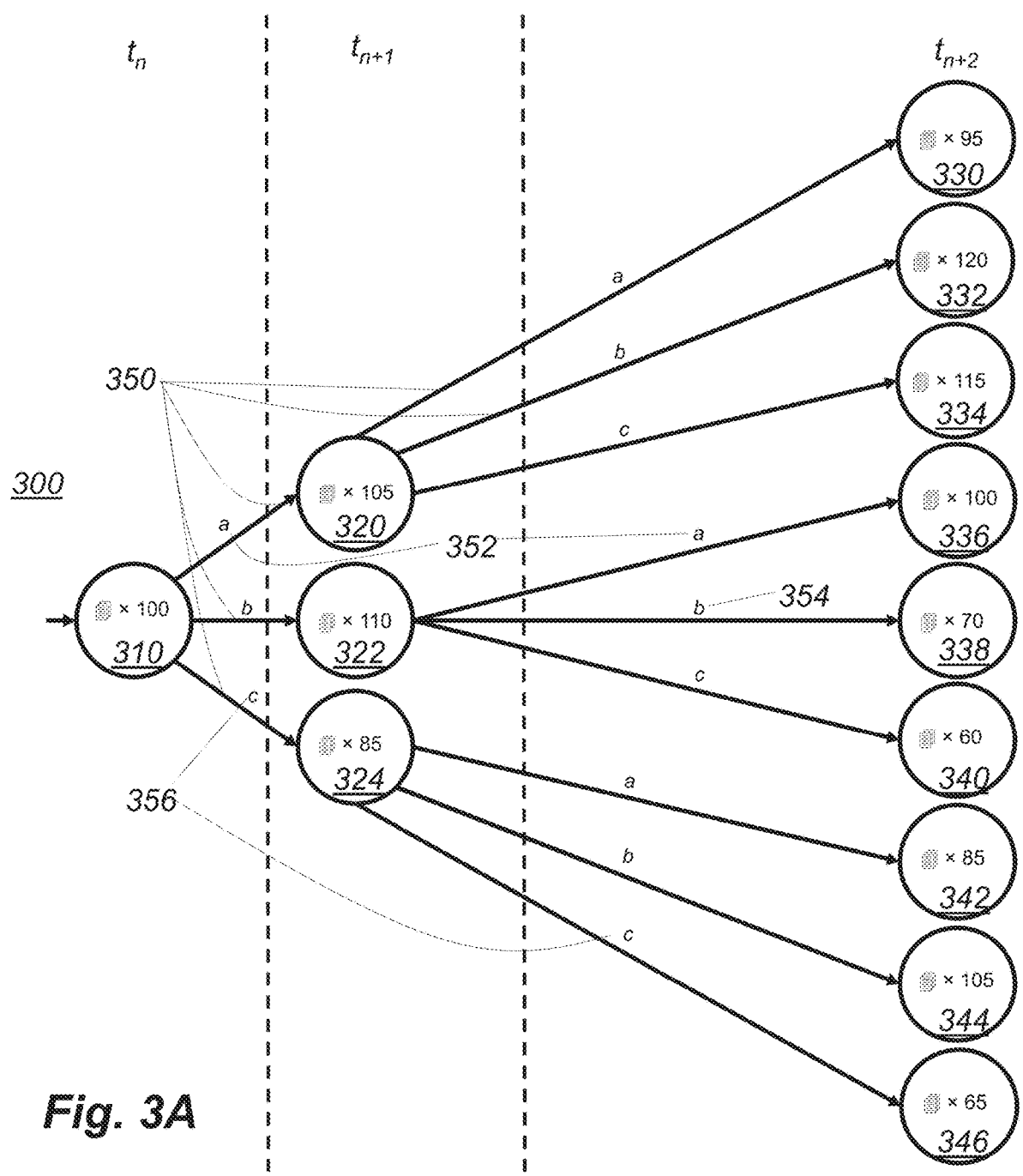
FIG. 3A depicts (at least a portion of) an exemplary data model.
Figure 3B:
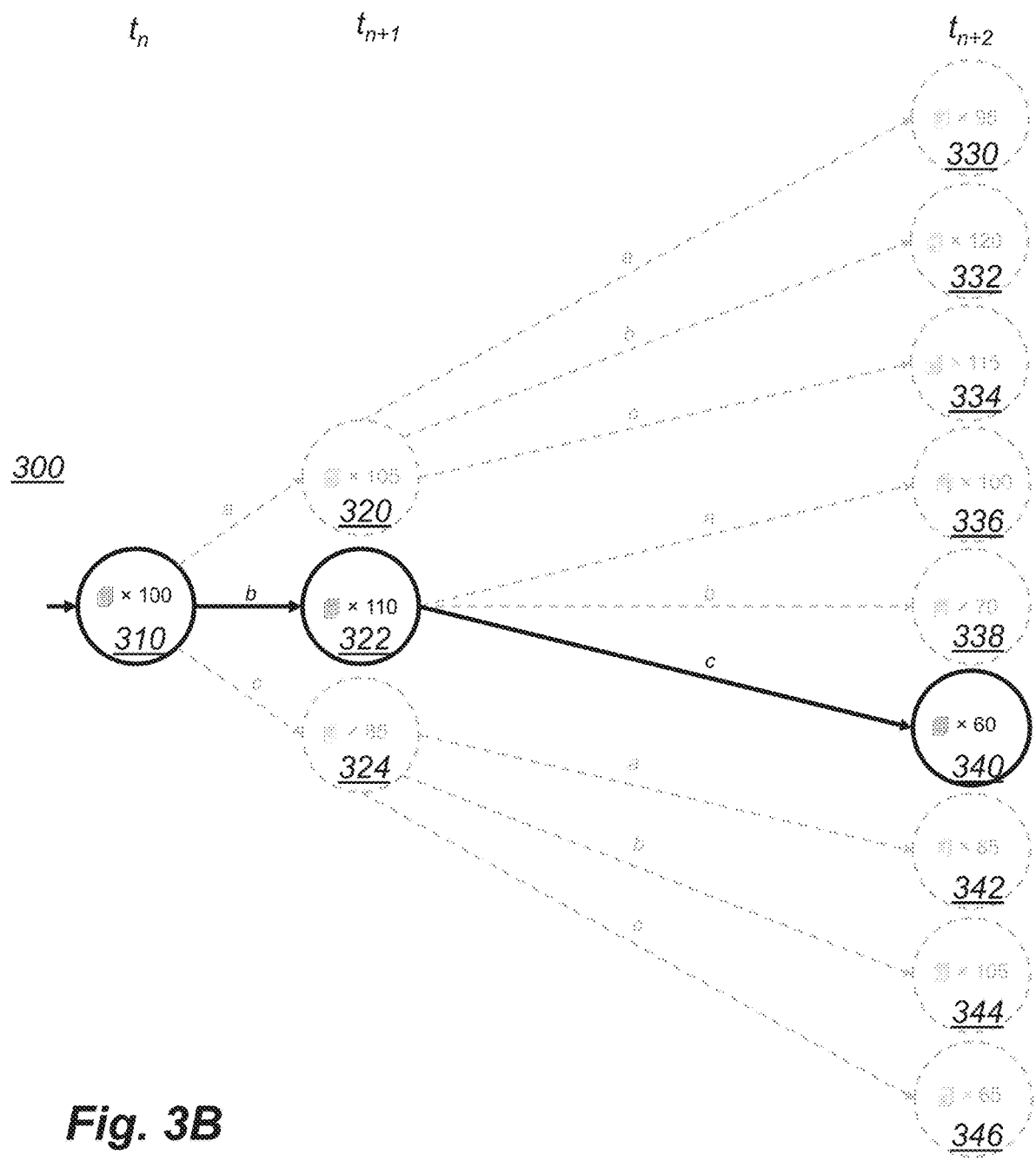
FIG. 3B depicts evolving states of a computerised resource repository in accordance with the data model of FIG. 3A based on various combinations of inputs at successive times.
Figure 3C:
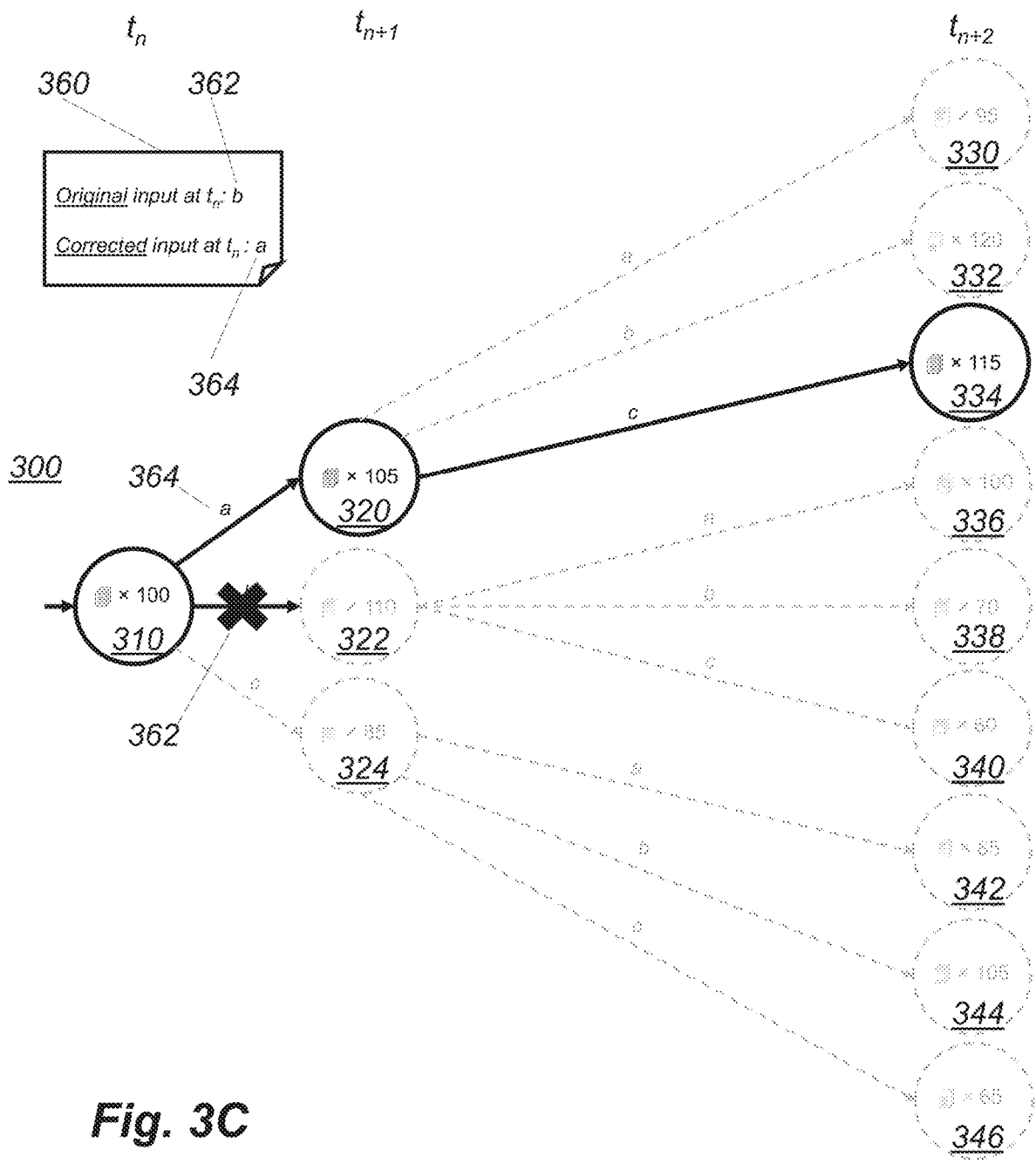
FIG. 3C depicts a replay event for the data model of FIG. 3A in response to error data.

Referring now to FIGS. 3A-3C, an exemplary data model 300—or at least a portion thereof—is depicted. Data model 300 comprises update rules 350 for a plurality of possible repository states 310-346 based on various combinations of inputs 352, 354, 356 received at successive processing stages. In the illustrated example of FIG. 3A (which is not intended to be limiting), twelve update rules 350 are depicted, which uniquely define transitions between the thirteen states 310-346 at successive stages in response to three possible inputs 352, 354, 356. However, it will be recognised by those skilled in the art that the state space for a repository may in practice comprise a great deal more states than this (and, indeed, may be infinite), that the space of possible data model inputs may be much greater than this (and may be infinite), and that a real data model may define many more update rules than are depicted in FIG. 3A (and may define infinitely many such rules). In cases where the space of possible inputs is large, exact repetitions of a data model input might never occur, or might occur very infrequently—for example, whilst exemplary data model 300 illustrated in FIG. 3A shows update rules 350 for the same inputs a, b and c (352, 354, 356) at both the initial processing stage $t_n$ and the subsequent processing stage $t_{n+1}$, it may be the case in practice that some new input a', b' or c' (not shown) is received at stage $t_{n+1}$ having not been seen previously.

The data model 300 specifies how repositories should be "advanced" from one particular state to the next in response to inputs arriving. The update rules 350 of data model 300 can be defined generally as a partial or total function $f$: S×I→S for a state space S and an input space I, which takes in a "current" state and an input, or set of inputs $\{i_1, i_2 \ldots i_n\}$, and outputs a "next" or "updated" state s∈S for the repository. In many examples, data model 300 can define a single common set of update rules to be applied across a plurality of repositories. That is, for two repositories $r_1$, $r_2$ having identical current state and belonging to a given plurality of repositories R, data model 300 can have the property that the same input applied to both $r_1$ and $r_2$ will cause both of $r_1$ and $r_2$ to be updated to the same identical subsequent state, i.e. being well-defined.

With reference to FIG. 3A, update rules 350 may be understood by reference to their effect on a repository having state 310 at some specifically marked "present" or "initial" moment in time $t_n$, prior to the receipt of any inputs 352, 354, 356 by repository controller 100. At the initial stage $t_n$, no input has been sent from input provider 104 to repository controller 100, and the repository holds one hundred units of the resource (or at least the logical representation thereof). At a subsequent stage $t_{n+1}$, after an input has been received by repository controller 100, which may be first input 352 (denoted "a" in FIGS. 3A-3C), second input 354 (denoted "b") or third input 356 (denoted "c"), data model 300 dictates that the repository should be updated to a new state, which will be one of states 320, 322 or 324 depending on whether the received input was first input 352, second input 354 or third input 356, respectively. State 320, reached from initial state 310 by the arrival of first input 352, holds one hundred and five units of the resource. State 322, reached from initial state 310 by the arrival of second input 354, holds one hundred and ten units of the resource. State 324, reached from initial state 310 by the arrival of third input 356, holds eighty-five units of the resource.

At this subsequent processing stage $t_{n+1}$, repository controller 100 may compute a further updated state upon receipt of another input 352, 354, 356. For example, if the repository is in state 320 and first input 352 is received, an update rule in data model 300 dictates that the next state for the repository is state 330. If the repository is in state 320 and a second input 354 is received, an update rule in data model 300 dictates that the next state for the repository is state 332. If the repository is in state 320 and a third input 356 is received, an update rule in data model 300 dictates that the next state for the repository is state 334.

Similarly, if the repository is in state 322 and first input 352 is received, an update rule in data model 300 dictates that the next state for the repository is state 336. If the repository is in state 322 and a second input 354 is received, an update rule in data model 300 dictates that the next state for the repository is state 338. If the repository is in state 322 and a third input 356 is received, an update rule in data model 300 dictates that the next state for the repository is state 340.

Finally, if the repository is in state 324 and first input 352 is received, an update rule in data model 300 dictates that the next state for the repository is state 342. If the repository is in state 324 and a second input 354 is received, an update rule in data model 300 dictates that the next state for the repository is state 344. If the repository is in state 324 and a third input 356 is received, an update rule in data model 300 dictates that the next state for the repository is state 346.

Subsequently, after this next input has been received by repository controller 100 (i.e. at processing stage $t_{n+2}$), data model 300 yields a new state for the repository, which will be one of states 330, 332, 334, 336, 338, 340, 342, 344 or 346 depending on the combination of inputs received. State 330, reached from initial state 310 by the arrival of two successive instances of first input 352, holds ninety-five units of the resource. State 332, reached from initial state 310 by the arrival of an instance of first input 352 followed by an instance of second input 354, holds one hundred and twenty units of the resource. State 334, reached from initial state 310 by the arrival of an instance of first input 352 followed by an instance of third input 356, holds one hundred and fifteen units of the resource. State 336, reached from initial state 310 by the arrival of an instance of second input 354 followed by an instance of first input 352, holds one hundred units of the resource. State 338, reached from initial state 310 by the arrival of two successive instances of second input 354, holds seventy units of the resource. State 340, reached from initial state 310 by the arrival of an instance of second input 354 followed by an instance of third input 356, holds sixty units of the resource. State 342, reached from initial state 310 by the arrival of an instance of third input 356 followed by an instance of first input 352, holds eighty-five units of the resource. State 344, reached from initial state 310 by the arrival of an instance of third input 356 followed by an instance of second input 354, holds one hundred and five units of the resource. State 346, reached from initial state 310 by the arrival of two successive instances of third input 356, holds sixty-five units of the resource.

FIG. 3B depicts an example of one possible "path" through the states according to update rules 350 of data model 300 which may be taken in practice by repository controller 100 for a given computerised resource repository. In the illustrated example, repository controller 100 computes two state updates for a repository (initially in state 310 at processing stage $t_n$), in response to the receipt of two successive inputs from input provider 104. First, repository controller 100 receives second input 354 from input provider 104 and uses data model 300 to determine that the repository should be updated to state 322, in which the repository holds one hundred and ten units of the resource, ten more than initial state 310. Subsequently, at stage $t_{n+1}$ repository controller 100 receives third input 356 from input provider 104 and uses data model 300 to determine that the repository should be updated to state 340, in which the repository holds sixty units of the resource, forty fewer than initial state 310 (and fifty fewer than the intermediate state 322).

In this example, repository controller 100 may request acquisition or relinquishment of the resource from or to resource provider 102 as each input is received and the updated states are computed. That is, after computing the update from state 310 to state 322 in response to second input 354, repository controller 100 may attempt to increase the volume of resource in the repository to one hundred and ten units, e.g. by requesting to acquire ten units of the resource from resource provider 102. Then, after computing the update from state 322 to state 340 in response to third input 356, repository controller 100 may attempt to decrease the volume of resource in the repository to sixty units, e.g. by requesting to relinquish the appropriate number of units of the resource to the resource provider 102. In other examples, repository controller 100 may take no action upon computing state 322 based on data model 300 and second input 354, in terms of resource allocation, but may elect to enact a state update for the computerised resource repository only later. In any event, as previously mentioned, it may be the case that the resource acquisition/relinquishment requests are only fulfilled by resource provider after a latency delay has passed, and it may be the case that the actual amount of resource acquired or relinquished differs from the volume requested by repository controller 100.

Reference is now made to FIG. 3C, which depicts a replay event in response to error data 360. In embodiments of the present invention, input provider 104 (and optional additional input providers 106 . . . , further reference to which is omitted merely for the sake of brevity) may be responsible for the transmission of substantially large volumes of input data to repository controller 100, and may continue to do so over substantially extensive periods of time. The appearance of errors among this input data at such scales and timeframes is almost inevitable, and it is hence desirous for repository controller 100 to be capable of mitigating or eliminating the impact of such errors upon the states and contents of each repository in the plurality of computerised resource repositories. Ideally, repository controller 100 should be able, given details of an error which has occurred in prior input (including the "true" or "corrected" value for the erroneous input) to perform compensatory state updates to one or more repositories which have been affected by the error, with the end result that all repositories are in the states they would have been in had the error never occurred. This way, any repositories which have been caused to depart or diverge from the data model by the presence of the input error can have a state update applied to them by repository controller 100 in order to bring them back in line with the state they ought to have, given the historical inputs received for data model 300.

Repository controller 100 is configured to receive error data 360 from input provider 104 in some suitable form, such as XML, JavaScript object notation (JSON), or any other appropriate data structure or format as will be recognised by those skilled in the art. In the example shown in FIG. 3C, error data 360 comprises an indication of an input 362 received by repository controller 100 from input provider 104 at a past processing stage $t_n$ which was sent in error. In the example, error data 360 also comprises an indication of the "corrected", "intended" or "true" value which input provider should have transmitted to repository controller 100 at past processing stage $t_n$. Of course, it will be recognised by those skilled in the art that error data 360 need not comprise or consist of this specific combination of values—for example, error data 360 may contain only indication 364 showing the "corrected" value at $t_n$, since this would be sufficient to enable calculation of the intended repository state as described below (though indication 362 may nevertheless provide some benefit for verification or bookkeeping purposes). Additionally or alternatively, error data may not need to specify the processing stage $t_n$ at which the erroneous data was received, and may be able to specify the erroneous input (and its correction) through reference to any other suitable unique identifier.

Subsequent to receiving error data 360, repository controller 100 uses error data 360 in combination with data model 300 and the known prior inputs in order to compute an intended state of the repository or repositories affected by the error. The intended state may correspond to an assumed current state that the repository/repositories would be in, according to the data model and previous input data, if the error had never occurred.

For instance, in the example depicted across FIGS. 3B and 3C, the set of relevant historical inputs comprises an occurrence of second input 354 at stage $t_n$ and an occurrence of third input 356 at stage $t_{n+1}$, which, in combination, lead the repository from its initial state 310 to its current state 340, having sixty units of the resource. Subsequently, repository controller 100 receives error data 360 indicating that the occurrence of second input 354 at stage $t_n$ was, in fact, an error, and that the intended "correct" input for this processing stage was instead an instance of first input 352. In the absence of error data to the contrary, repository controller 100 may assume that the remainder of the prior input (in this case, the instance of second input 354 received at stage $t_{n+1}$) is correct.

In order to determine the "intended" state in the absence of the error, processor 200 of repository controller computes the state arrived at by "rolling back" the current state of any given repository to the point immediately prior to the erroneous input; in this case, by rolling back to $t_n$, processor 200 arrives at initial state 310. Next, processor 200 uses corrected input value 364 in conjunction with data model 300 to compute the intermediate state 320 to which the repository should have been advanced at stage $t_{n+1}$ in the absence of the error.

Finally, processor 200 uses the remaining historical input data to compute, using data model 300, the final state update for the repository from state 320 to state 334, the intended "final" state at which the repository should have come to rest at processing $t_{n+2}$ if the error had not occurred—in this intended state 334, the repository would have physically or logically held one hundred and fifteen units of the resource.

At this point in the method, repository controller 100 determines (using processor 200) the difference between the current volume of the resource in the computerised resource repository (sixty units of the resource, since the repository is in state 340) and the volume of the resource in the intended state of the computerised resource repository (one hundred and fifteen units). In the example depicted in FIGS. 3B and 3C, repository controller 100 uses processor 200 to subtract sixty from one hundred and fifteen, thereby arriving at a determined difference of fifty-five units. This difference may be referred to as a "discrepancy" or an "error term", and is useful to repository controller in that it represents the volume of the resource which must be acquired to (or relinquished from) the affected repository in order to negate the effect of the error and converge with the intended state in accordance with data model 300.

It will be observed that in the above illustrated example, one input error at an early processing stage for data model 300 eventually led to a substantial discrepancy between the intended volume of the resource and the actual volume of the resource in the repository. Whilst the error's impact upon the resource volume at stage $t_{n+1}$ was only relatively minor, its effect was compounded as further inputs were received from input provider 104 and processed by repository controller 100. In other words, the data model is highly path-dependent, in the sense that a single, potentially minor historic error in input affecting a repository can have a significant large impact on the state of the repository in the long term, making it necessary to replay the inputs from the point in time of the error occurring, by correcting the error, then theoretically recalculating each processing stage, and finally determining the change in the state of the repository. The present invention may be particularly effective when applied in connection with such path-dependent data models.

Figure 4:
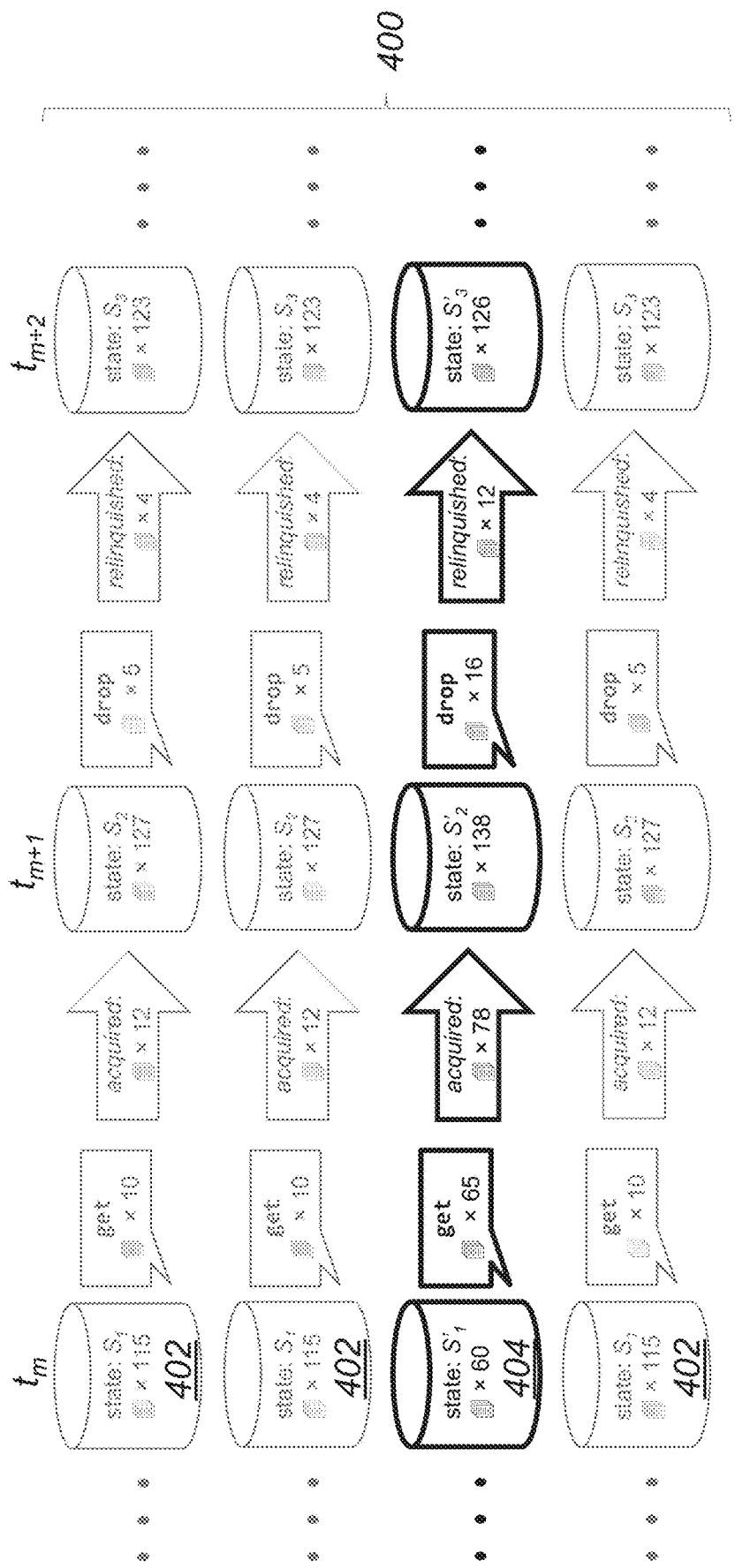
FIG. 4 depicts an exemplary "naïve" closed-loop approach to error correction for a set of repositories.

Reference is now made to FIG. 4, which depicts a naïve method of error compensation, as previously discussed, for a plurality of computerised resource repositories 400. For the sake of simplicity, and in order to better illustrate the process of steering a repository which has been affected by an input error towards its "intended state", the plurality of repositories 400 is shown as comprising several repositories 402 in a common "correct" state $S_1$ and a repository 404 in an "incorrect" state $S'_1$, all of which are being managed by repository controller 100 in response to data model inputs (not shown) that have an identical effect on all of repositories 402 and on repository 404. However, as will be understood by those skilled in the art, a real plurality of computerised resource repositories 400 may comprise repositories in a plurality of different and distinct states, and data model inputs may therefore impact the computed state for many of these repositories differently. In some embodiments, data model inputs may be provided which affect the state of only one repository of the plurality of repositories 400 while leaving the state of the other repositories unchanged.

In the example depicted in FIG. 4, at an initial processing stage $t_m$, repositories 402 are each in state $S_1$, and hence each contain (or are otherwise linked to) one hundred and fifteen units of the resource. At this same processing stage, affected repository 404 is in an "incorrect" state $S'_1$ and hence contains (or is linked to) only sixty units of the resource. There is therefore, at this processing stage, a difference of fifty-five units between the state of repository 404 and the state $S_1$ (which here, for the purposes of illustration, represents the intended state for repository 404 in the absence of the prior error), and repository controller has determined this difference via a replay event as previously described. It may be difficult, impractical or even impossible for repository controller 100 to fix this discrepancy immediately due to the frequency of received data model inputs and subsequent necessary state updates for the plurality of repositories 400; new inputs and updates may be received and generated during the window in which repository controller 100 is attempting to acquire the missing fifty-five resource units (in this case), meaning that the "correct" state will be different by the time the resources have been acquired, making the new state out-of-date immediately.

In an attempt to prevent this problem, repository controller may try amending the requests made to resource provider 102 on behalf of the affected repository 404 in such a way as to compensate for the discrepancy between the states. In the example of FIG. 4, in accordance with a received input (not shown), repository controller 100 makes a determination using data model 300 that the volume of the resource in computerised resource repositories 402 should be increased by ten units, and transmits a request to resource provider 102 accordingly. At the same time (or at about the same time), repository controller 100 transmits a request to resource provider 102 to try to acquire sixty-five units of the resource for affected repository 404 (and hence compensate for the discrepancy while advancing the repository's state according to the intended state and data model 300).

Due to unpredictable unreliability on the part of resource provider 102, each repository acquires a slightly greater volume of the resource than was requested by repository controller 100. Each repository 402 beginning in state $S_1$ actually acquires twelve units of the resource, rather than ten, and hence is in a new state $S_2$ at the subsequent processing stage $t_{m+1}$ having one hundred and twenty-seven units of the resource. Meanwhile, affected repository 404 actually acquires seventy-eight units of the resource, rather than sixty-five, and hence is advanced from state $S'_1$ to a new state $S'_2$ at the subsequent processing stage $t_{m+1}$, having one hundred and thirty-eight units of the resource, meaning that the error has not been corrected.

Once again, an input (not shown) is received by repository controller 100, and accordingly a determination is made using data model 300 that the volume of the resource in computerised resource repositories 402 should be decreased by five units, and a relevant request (or set of requests) is/are transmitted to resource provider 102. At the same time (or at about the same time), repository controller 100 transmits a request to resource provider 102 to try to relinquish sixteen units of the resource for affected repository 404 to fix the discrepancy.

Due to unpredictable unreliability on the part of resource provider 102, each repository relinquishes a slightly smaller volume of the resource than was requested by repository controller 100. Each repository 402 formerly in state $S_2$ actually relinquishes four units of the resource, rather than five, and hence is in a new state $S_3$ at the subsequent processing stage $t_{m+2}$ having one hundred and twenty-three units of the resource. Meanwhile, affected repository 404 actually relinquishes twelve units of the resource, rather than sixteen, and hence is advanced from state $S'_2$ to a new state $S'_3$ at the subsequent processing stage $t_{m+2}$, having one hundred and twenty-six units of the resource, meaning that the error has still not been corrected.

In this way, it can therefore be seen that such an approach to the correction of state discrepancies following their determination via a replay event is sub-optimal; whilst the approach may, as in this example, lessen the magnitude of the discrepancy, it may still persist for several more processing stages. Indeed, the discrepancy may (at least in principle) persist indefinitely, never being resolved, due to the unreliable properties of the resource provider for externally acquiring and/or relinquishing the resource to and from repository controller 100 and its plurality of repositories 400. It is not immediately obvious (without the benefit of the present disclosure) how this issue can reasonably be resolved.

Figure 5B:
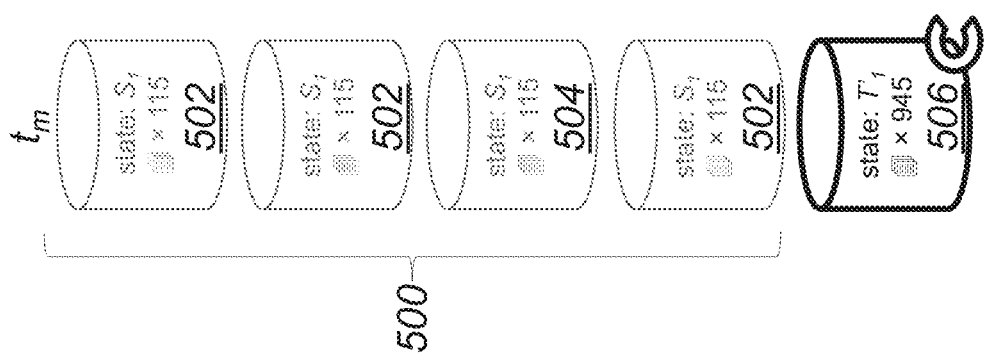
FIGS. 5A-5B depict an improved approach involving the use of a control repository to allocate a volume of the resource equal to the determined difference, in accordance with an embodiment of the present invention.
Figure 5A:
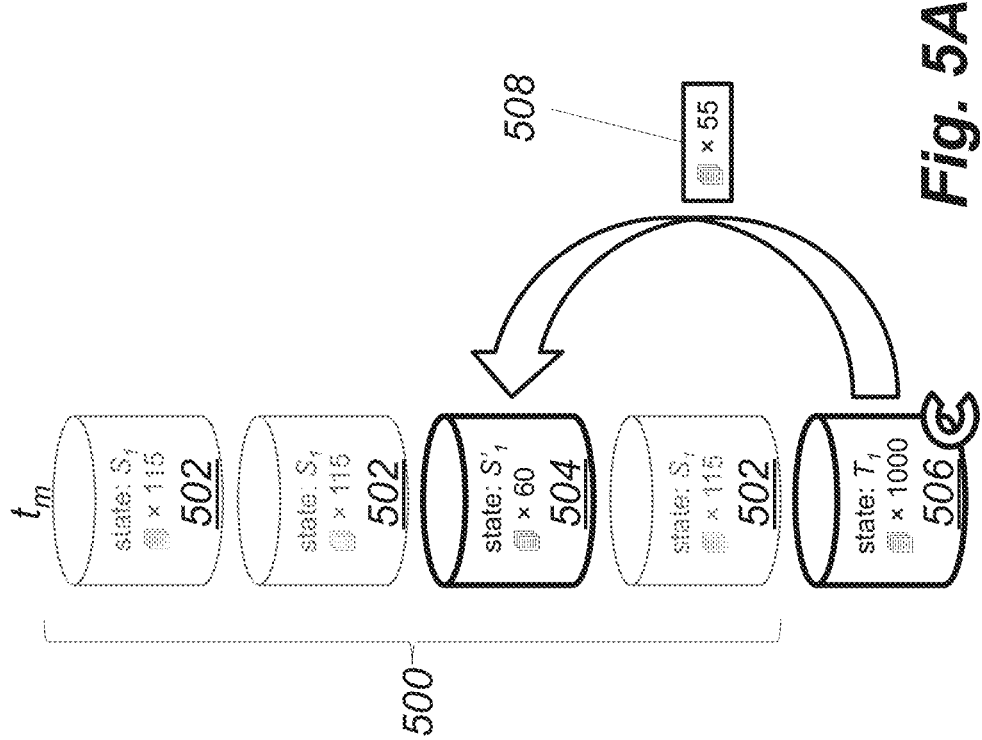

FIGS. 5A and 5B depict a solution to the above problem in accordance with an embodiment of the present invention. With reference to FIG. 5A, there is shown a plurality of computerised resource repositories 500 comprising several repositories 502 in state $S_1$ and a repository 504 which, due to a prior erroneous input, has come to be in state $S'_1$ at processing stage $t_m$, rather than its intended state $S_1$. The plurality of repositories 500 may be similar to the plurality of repositories 400 previously described, in the sense that repositories 502 may be similar to repositories 402, and affected repository 504 may be similar to affected repository 404. However, in the embodiment shown in FIGS. 5A and 5B, unlike the example of FIG. 4, repository controller 100 makes use of (at least one) special "control" computerised resource repository 506, marked in FIGS. 5A and 5B by a "C" symbol in its lower-right corner, as part of the error correction process as described in more detail below.

FIG. 5A shows a plurality of repositories 500 and the control repository 506 at a processing stage $t_m$ after repository controller 100 has received error data 360 and used it in conjunction with data model 300 and historical data comprising previous data model inputs to compute the intended state of affected repository 504, as previously described herein. A determination is made, by repository controller 100, of the difference 508 between the volume of the resource in affected repository 504 and the volume of the resource in the computed intended state—in this case, fifty-five units of the resource.

Rather than attempting to fix the difference 508 by acquiring or relinquishing a volume of the resource "externally", e.g. to/from resource provider 102, repository controller 100 instead compensates affected repository 504 by allocating a volume of the resource equal to determined difference 508 directly from control repository 506 to affected repository 504—or vice versa—to correct the difference. That is to say, in cases where the determined difference indicates an excess of the resource in affected repository 504 compared with its intended state, the difference is corrected by transferring the appropriate volume of the resource from affected repository 504 to control repository 506, and in cases where the determined differences indicates a shortage of the resource in affected repository 504 compared with its intended state, the difference is corrected by transferring the appropriate volume of the resource from control repository 506 to affected repository 504. In the embodiment of FIG. 5A, for example, repository controller 100 determines that fifty-five units of the resource should be allocated to control repository 506 to affected repository 504 to correct the determined difference 508.

FIG. 5B depicts the plurality of repositories 500 and control repository 506 immediately after the direct allocation from control repository 506 to affected repository 504. As can be seen, repository 504 has been returned to its intended state, $S_1$, and holds (or is otherwise associated with) the "correct" resource volume according to data model 300, i.e. one hundred and fifteen units, without any need for repository controller 100 to interact with resource provider 102. In the illustrated embodiment, after the volume is transferred, control repository 506 has nine hundred and forty-five units of the resource remaining. All of this has occurred, in the illustrated embodiment, "within" processing stage $t_m$, before the passage of time and/or occurrence of events (such as repository controller 100 receiving one or more data model inputs) brings about the subsequent processing stage $t_{m+1}$.

In some embodiments, the direct allocation from repository 504 to control repository 506 or vice-versa occurs instantaneously. In some embodiments, the direct allocation occurs substantially instantaneously. In some embodiments, where there is a latency delay between the transmission of a request from repository controller 100 to resource provider 102 and the subsequent state update to a given repository, the direct allocation occurs in a window of time briefer than said latency delay.

In preferred embodiments of the invention, control repository 506 is not a member of the plurality of repositories 500. That is, state updates for control repository 506 are not computed based on the same update rules used to compute state updates for the "normal" computerised resource repositories such as repositories 502 and affected repository 504. In some embodiments, repository controller 100 is configured to determine whether the volume of the resource in control repository 506 at a given instance lies outside of a threshold range and, if so, to update its state to bring said volume within the threshold range. For example, control repository 506 may be associated with a predetermined "lower limit" or a predetermined "upper limit", or, preferably, both a predetermined lower limit and a predetermined upper limit.

Preferably, updating the state of control repository 506 to bring its volume within the threshold range comprises use of an external source, such as resource provider 102, to acquire or relinquish an appropriate quantity of the resource. Bringing the volume within the threshold range may comprise acquiring/relinquishing a volume of the resource to bring said volume to a specific predetermined value within the threshold range, for example the midpoint of the threshold range. By way of non-limiting example, with reference to FIG. 5B, control repository 506 may have a lower limit of five hundred units of the resource and an upper limit of one thousand five hundred units of the resource, and upon determining that either of these limits has been overstepped, repository controller 100 may be configured to acquire or relinquish (or attempt to acquire/relinquish) a volume of the resource from or to resource provider 102 sufficient to bring the volume of the resource in control repository 506 back to one thousand units. In some embodiments, the state of control repository 506 is updated only in accordance with a determination that its volume lies outside of the threshold range.

Those skilled in the art will recognise that the use of such a threshold range is not an essential feature of the present invention, and that there may be embodiments in which the only state changes undergone by control repository 506 are the allocations of resources to and/or from members of the plurality of repositories 500 (such as repository 504) to correct discrepancies brought about by erroneous prior input data.

In preferred embodiments of the present invention, it is possible for the state of control repository 506 to contain or otherwise be associated with a volume of the resource which is negative, i.e. less than zero. For instance, in cases where the resource is non-physical and/or where the resource is stored as a logical representation, control repository 506 may exist as a virtual repository, capable of containing or representing a deficit of the resource which may be filled later by use of resource provider 102.

The one or more control repositories 506 may be physically, logically and/or virtually stored in repository controller 100, for example in memory 204 as previously discussed. Additionally and/or alternatively, the one or more control repositories 506 may be stored in another system communicatively coupled to and accessible by repository controller 100. Preferably, the one or more control repositories 506 are stored in such a configuration as to be rapidly accessed by repository controller 100, so as to facilitate the fast transfer of volumes of the resource to and from the plurality of repositories 500. In embodiments where multiple control repositories 506 are used, it may be the case that some of the control repositories 506 are stored in repository controller 100 and others are stored in another system communicatively coupled to and accessible by repository controller 100.

In some embodiments, repository controller receives data model inputs from a plurality of input providers 104, 106, . . . , with each individual data model input being provided by a distinct input provider from the plurality. By way of illustrative and non-limiting example, the input at processing stage $t_n$ in the example of FIGS. 3A-3C (originally an instance of second input 354 or "b", and corrected to an instance of first input 352 or "a") may have been received from input provider 104, and the input at the subsequent processing stage $t_{n+1}$ (an instance of third input 356, or "c") may have been received from additional input source 106.

Furthermore, each control resource repository used by repository controller 100 may be linked with a different input provider, with repository controller 100 being configured to select which control repository is used to allocate the volume of the resource to fix the discrepancy based upon which input provider supplied the erroneous input. Continuing with the example above with reference to the Figures, repository controller 100 may select control repository 506 to allocate the fifty-five units of the resource based on a determination that repository 506 is linked with input provider 104 (which provided the erroneous input at $t_n$), rather than using the control repository (not shown) for input provider 106, which was not responsible for the error. In this sense, discrepancies introduced by erroneous input are "owned" by the provider of said erroneous input.

Figure 6:
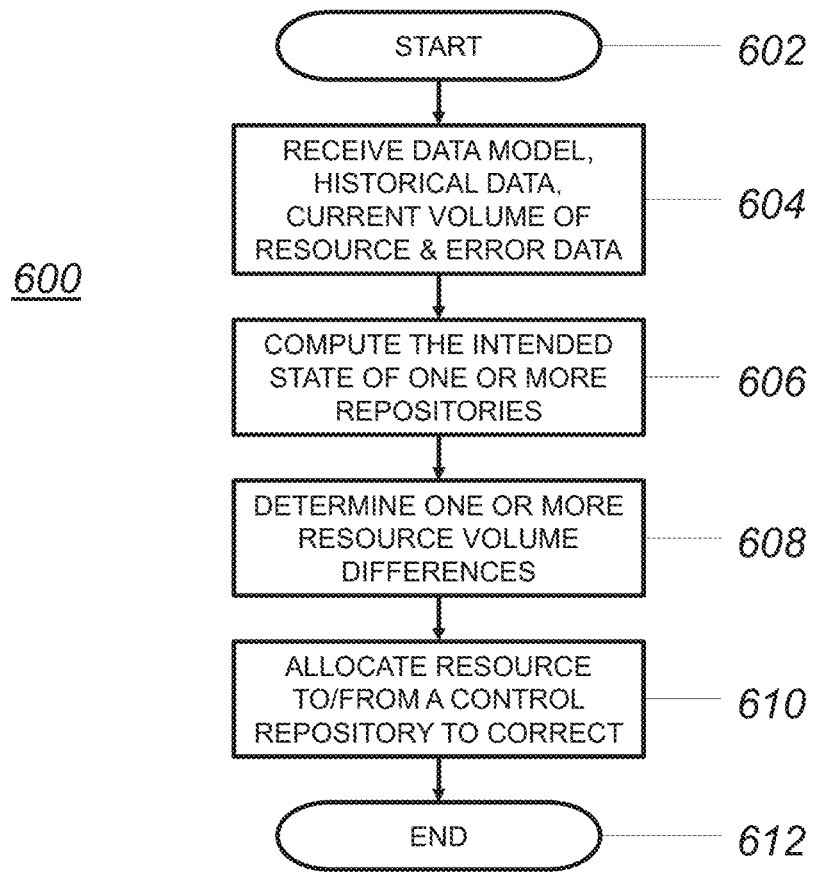
FIG. 6 is a flowchart of a computer-implemented method for controlling a plurality of computerised resource repositories within a resource allocation system in accordance with an embodiment of the present invention.

Referring now to FIG. 6, a computer-implemented method for controlling a plurality of computerised resource repositories within resource allocation system 10 is depicted, in accordance with an embodiment of the present invention.

In step 604, the data model, historical data, current volume data and error data are received. The data model comprises rules for updating the state of each computerised resource repository of the plurality of resource repositories based on one or more inputs. The state of each computerised resource repository comprises a volume of the resource in said each computerised resource repository. The historical data comprises a plurality of previous inputs to the data model. The current volume data comprises data indicative of the current volume of the resource in a first computerised resource repository of the plurality of computerised resource repositories. The error data is indicative of an error in one of the previous inputs of the historical data.

Optionally, the historical data can comprise additional historical data. For instance, the historical data may comprise data indicative of the former states of the first computerised resource repository. Additionally or alternatively, the historical data may comprise data indicative of the volume of the resource associated with each of said former states. The former states may comprise some or all of the sequence of states through which the first computerised resource repository passed from the processing stage at which the error occurred up to its "current" state (i.e. its state at the point when the method comes to be executed on a computer device). In some embodiments, the historical data comprises the state of the first computerised resource repository immediately prior to the erroneous input.

In step 606, an intended state of the first computerised resource repository is computed, based on the data model, historical data and error data. The intended state may correspond to an assumed current state of the first computerised resource repository, according to the data model and historical data, had the error never occurred.

In step 608, a difference between the current volume of the resource in the first computerised resource repository and the volume of the resource in the intended state of the first computerised resource repository is determined.

In step 610, a volume of the resource equal to the determined difference is allocated to the first computerised resource repository from a control computerised resource repository, or vice versa, to correct the difference.

The term "comprising" encompasses "including" as well as "consisting" e.g. a composition "comprising" X may consist exclusively of X or may include something additional e.g. X+Y.

Unless otherwise indicated each embodiment as described herein may be combined with another embodiment as described herein.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, hard-drives, thumb drives, memory cards, etc. and do not include propagated signals. The software can be suitable for execution on a parallel processor or a serial processor such that the method steps may be carried out in any suitable order, or simultaneously. This acknowledges that firmware and software can be valuable, separately tradable commodities. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realise that storage devices utilised to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realise that by utilizing conventional techniques known to those skilled in the art that all, or a portion of the software instructions may be carried out by a dedicated circuit, such as a DSP (Digital Signal Processor), programmable logic array, or the like.

It will be understood that the benefits and advantages described above may relate to one embodiment or may relate to several embodiments. The embodiments are not limited to those that solve any or all of the stated problems or those that have any or all of the stated benefits and advantages.

The steps of the methods described herein may be carried out in any suitable order, or simultaneously where appropriate. Additionally, individual steps may be deleted from any of the methods without departing from the spirit and scope of the subject matter described herein. Aspects of any of the examples described above may be combined with aspects of any of the other examples described to form further examples without losing the effect sought. Any of the steps or processes described above may be implemented in hardware or software.

It will be understood that the above descriptions of preferred embodiments are given by way of example only and that various modifications are possible within the scope of the appended claims and may be made by those skilled in the art. Although various embodiments have been described above with a certain degree of particularity, or with reference to one or more individual embodiments, those skilled in the art could make numerous alterations to the disclosed embodiments without departing from the scope of this invention.

The "errors", "error data", "input errors", "erroneous inputs/data/input data" described hereinabove may take various forms and comprise an indication of any one (or more) of a variety of kind of error. Different kinds of error may be associated with different kinds of correction. In some cases, the error in a given input may have been the inclusion of an erroneous value within the input. For example, an input may comprise a numerical value which is incorrect, and which differs from the "correct" or "intended" value that would have been received from input source 104 had the errot not been made. An illustrative and non-limiting example of such a value could be a computer resource value (CPU utilisation and/or clock speed; number of processes, threads, handles, sockets and/or cores; cache size, RAM usage, pages, hard disk activity, network send/receive speed and so forth). A further illustrative and non-limiting example of such a value could be a sensor-measured value (voltage, current, resistance, conductance, impedance, light (or luminosity), temperature, sound, motion (e.g. translational or rotational), force, and so forth). A further illustrative and non-limiting example of such a value could be an electronic network-received value (cryptographic data; electronic market data, including electronic instrument price data (stock/share/fund unit/commodity/asset/bond/derivative data), public/private/symmetric key values, cryptographic nonce values, key exchange values (e.g. Diffie-Helman key exchange values), hash values, digital signatures, values received from APIs or RESTful services, and so forth). A further illustrative and non-limiting example of such a value could be a peripheral input value (e.g. input by a user via a mouse, keyboard, touchscreen, trackpad or trackball, joystick, microphone, camera, and so forth).

In such cases as these, the correction for the error may comprise a corrected value. The corrected value may be the value which was intended to be included within, as, or alongside the input data instead of the erroneous value. In such cases, computing the intended state according to the data model may comprise determining the state a repository would currently be in, according to the data model, if the correct value had been included in the erroneous input data instead of the incorrect value. Computing the state to which the initial state (immediately prior to the error) should have been advanced may comprise determining the state to which the initial state would have been advanced according to the data model if the correct value had been included in the erroneous input data instead of the incorrect value.

In other cases, the error may have been the mere fact of the input itself being received. For instance, an input may have been provided by input source 104 by accident or by mistake. An input may have been provided unintentionally. An input may have been provided on the basis of (and/or in response to) other incorrect data, wherein the provision of the correct "other" data to data source 104 would not have resulted in the input being provided by input source 104 at all. Such an input may comprise, e.g., a command to perform an action in relation to the computerised resource repositories (for instance, a state update, transfer, acquisition and/or relinquishing of a resource from one or more repositories). Input source 104 may comprise hardware or software configured to detect when an input has been provided erroneously (i.e. should not have been provided), and/or may comprise an interface for a user to identify an input manually as having been provided erroneously.

In such cases, the correction for the error may not need to comprise any "corrected value" as such, it being sufficient merely to identify which input was the erroneous input (e.g. based on a timestamp, a unique numerical identifier, or other suitable means). In such cases, computing the intended state according to the data model may comprise determining the state a repository would currently be in, according to the data model, if the input had never (or at least had not) been received. Computing the state to which the initial state (immediately prior to the error) should have been advanced may comprise determining the state to which the initial state would have been advanced according to the data model if the input had never (or at least had not) been received.

In some cases, the error in the previous input may be its not having been received from input source 104; that is, the error might be the absence of data or content at a previous point where data or content should have appeared or been expected. For example, it may be the case that one of the previous inputs of the historical data was an "empty" or "null" input (e.g. indicating the absence of any data, value, command or instruction for repository controller 100), but that input source 104 should have provided a "true" input (e.g. containing some data, value, command or instruction) to the repository controller to cause some state update according to the data model. An "empty" or "null" input may have no effect on the data model. The data model and/or the rules of the data model may be configured to make no change to the states of any of the computerised resource repositories in response to an "empty" or "null" input. The data model and/or rules thereof may ignore such inputs, or simply not parse them.

In such cases, the correction of the error may comprise an indication of an input which ought to have been received (but was not). In such cases, computing the intended state according to the data model may comprise determining the state a repository would currently be in, according to the data model, if the input had been received. Computing the state to which the initial state (immediately prior to the error) should have been advanced may comprise determining the state to which the initial state would have been advanced according to the data model if the input had been received.

The foregoing examples of kinds of input data error and corresponding corrections are not intended to constitute an exhaustive list, and serve merely as examples.

The invention claimed is:

1. A computer-implemented method for controlling a plurality of computerised resource repositories within a resource allocation system, the method comprising:
   receiving:
      a data model for a resource, the data model comprising rules for updating the state of each computerised resource repository of the plurality of computerised resource repositories based on one or more inputs, wherein the state of each computerised resource repository comprises a volume of the resource in said each computerised resource repository;
      historical data comprising a plurality of previous inputs to the data model;
      data indicative of the current volume of the resource in a first computerised resource repository of the plurality of computerised resource repositories; and
      error data indicative of an error in one of the previous inputs of the historical data;
   based on the data model, historical data and error data, computing an intended state of the first computerised resource repository;

determining a difference between the current volume of the resource in the first computerised resource repository and the volume of the resource in the intended state of the first computerised resource repository;

allocating a volume of the resource equal to the determined difference to the first computerised resource repository from a control computerised resource repository, or vice versa, to correct the difference;

receiving one or more data model inputs; and based on the data model and the one or more received inputs, updating the state of one or more computerised resource repositories of the plurality of computerised resource repositories;

wherein:
updating the state of a computerised resource repository comprises increasing or decreasing the volume of the resource in said computerised resource repository;

increasing or decreasing the volume of the resource for a computerised resource repository comprises updating by increasing or decreasing a volume of the resource from a source external to the implementing computer;

said increasing or decreasing is associated with a first latency delay; and allocating the volume of the resource equal to the determined difference is associated with a second latency delay, wherein the second latency delay is less than the first latency delay.

2. The computer-implemented method of claim 1, further comprising:
determining whether the current volume of the resource in the control computerised resource repository is outside of a threshold range; and
in accordance with such a determination, updating the state of the control computerised resource repository to bring said volume within the threshold range.

3. The computer-implemented method of claim 1, wherein the first latency delay is caused by delays generated from the external source.

4. The computer-implemented method of claim 1, wherein the first latency delay is in a range from 1 hour to 72 hours, or in a range from 12 hours to 48 hours, and wherein the second latency delay is less than 12 hours, less than 1 hour, less than 1 minute, less than 1 second, less than 10 milliseconds, or less than 0.1 milliseconds.

5. The computer-implemented method of claim 1, wherein allocating the volume of the resource equal to the determined difference occurs instantaneously.

6. The computer-implemented method of claim 1, wherein the intended state of the first computerised resource repository corresponds to an assumed current state of the first computerised resource repository, according to the data model and historical data, had the error never occurred.

7. The computer-implemented method of claim 1, further comprising:
receiving data indicative of the current volume of the resource in a second computerised resource repository of the plurality of computerised resource repositories;

based on the data model, historical data and error data, computing an intended state of the second computerised resource repository;

determining a difference between the current volume of the resource in the second computerised resource repository and the volume of the resource in the intended state of the second computerised resource repository; and allocating a volume of the resource equal to the determined difference to the second computerised resource repository from the control computerised resource repository, or vice versa, to correct the difference.

8. A computer-implemented method for controlling a plurality of computerised resource repositories within a resource allocation system, the method comprising:
receiving:
a data model for a resource, the data model comprising rules for updating the state of each computerised resource repository of the plurality of computerised resource repositories based on one or more inputs, wherein the state of each computerised resource repository comprises a volume of the resource in said each computerised resource repository;

historical data comprising a plurality of previous inputs to the data model;

data indicative of the current volume of the resource in a first computerised resource repository of the plurality of computerised resource repositories; and error data indicative of an error in one of the previous inputs of the historical data;

based on the data model, historical data and error data, computing an intended state of the first computerised resource repository;

determining a difference between the current volume of the resource in the first computerised resource repository and the volume of the resource in the intended state of the first computerised resource repository; and allocating a volume of the resource equal to the determined difference to the first computerised resource repository from a control computerised resource repository, or vice versa, to correct the difference, wherein:
each data model input is received from an input provider of a plurality of input providers;
the control computerised resource repository is one of a plurality of control computerised resource repositories, each control computerised resource repository being linked with an input provider; and
the control computerised resource repository selected for correcting the difference is linked with the input provider responsible for the error.

9. A device comprising a memory and a processor, the memory containing instructions which, when executed by the processor, are configured to cause the processor to carry out the method of claim 1.

10. A computer program comprising computer-readable instructions which, when executed by a processor, are configured to cause the processor to carry out the method of claim 1.

* * * * *